Dec. 25, 1934.    R. H. SMITH    1,985,265
AIRCRAFT NAVIGATIONAL INSTRUMENT
Filed April 2, 1932    4 Sheets-Sheet 1

INVENTOR
ROBERT H. SMITH
BY
ATTORNEY

Dec. 25, 1934.   R. H. SMITH   1,985,265
AIRCRAFT NAVIGATIONAL INSTRUMENT
Filed April 2, 1932   4 Sheets-Sheet 2

INVENTOR
ROBERT H. SMITH
BY
ATTORNEY

Dec. 25, 1934.    R. H. SMITH    1,985,265
AIRCRAFT NAVIGATIONAL INSTRUMENT
Filed April 2, 1932    4 Sheets-Sheet 3
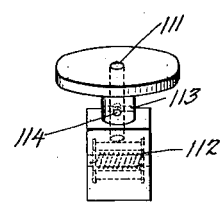
FIG. 5.
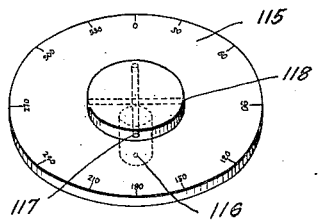
FIG. 6.
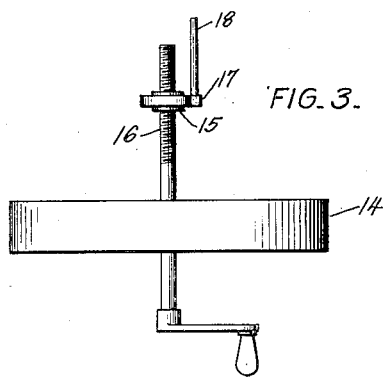
FIG. 3.
FIG. 4.
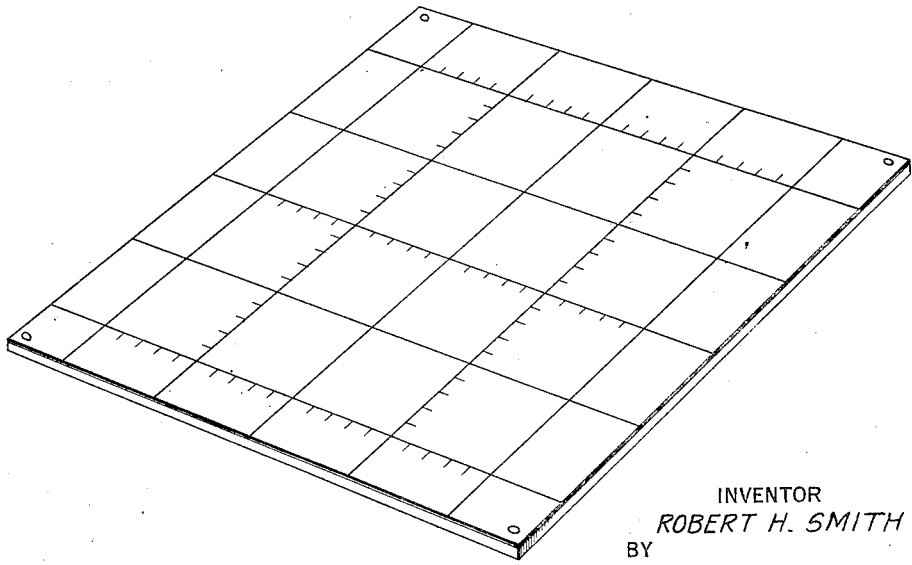
INVENTOR
ROBERT H. SMITH
BY
ATTORNEY

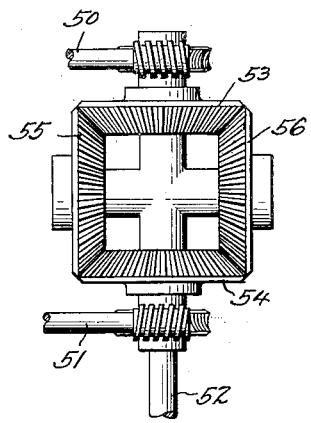
FIG_7_
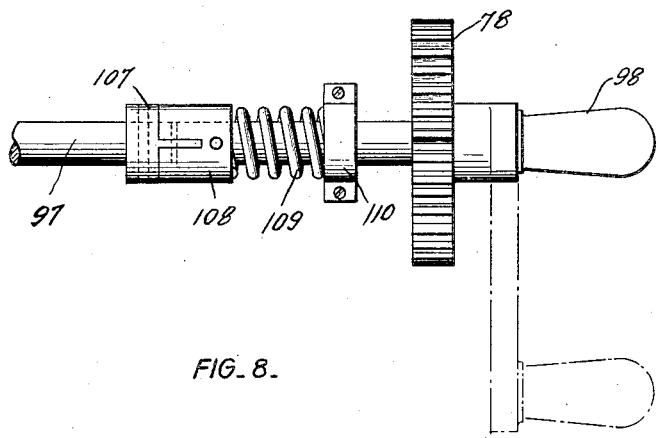
FIG_8_

Patented Dec. 25, 1934

1,985,265

UNITED STATES PATENT OFFICE 1,985,265

AIRCRAFT NAVIGATIONAL INSTRUMENT

Robert Hall Smith, United States Navy

Application April 2, 1932, Serial No. 602,848

5 Claims. (Cl. 73—151)

(Granted under the act of March 3, 1883, as amended April 30, 1928; 370 O. G. 757)

This invention relates to navigational instruments, and more particularly to aircraft dead reckoning position indicators, by which a pilot in an aircraft can at a glance see his position and also know the bearing and distance of the aircraft carrier or other base of operation.

When single seated airplanes are operating from an aircraft carrier, either alone or in formation, the duties of the pilots are so multifarious as to preclude navigation by the ordinary methods. With the throttle and controls to operate, a look-out to be kept, instruments to be observed and signals to be exchanged, a pilot in a single seated plane has no time to manipulate a chart, parallel rulers and a pencil. This invention accomplishes, with a minimum of settings, the determination of the airplane's geographical position or position relative to some fixed or moving base of operation at all times. The weight and dimensions of the instrument are such that its use in an airplane is entirely feasible.

One of the most difficult problems in the navigation of the single seated airplane occurs when operating at a distance at sea, without landmarks, and from a moving aircraft carrier. There are three factors affecting the relative position of the airplane to the carrier: The course and speed of the carrier, the force and direction of the wind, and the course and speed of the airplane. The navigation problem is too complicated to make a rough, quick calculation that can be relied upon, and the importance of locating the carrier at the end of a flight, when the gas is almost exhausted, is too vital to permit of such practice and, as stated above, the duties of the pilot are such as to make it impossible to use ordinary methods of navigational plotting. Hence, the urgency of providing some means to perform this service is readily seen.

This invention is so arranged as to indicate the geographical locations or the relative positions of the carrier and the plane at all times. The three factors are set on the machine, the machine started, changes in the factors set on the machine at the time of occurring, and the geographical position and the bearing and distance of the airplane from the carrier will be indicated at all times.

The objects of this invention are, first, to provide an instrument of little weight and small dimensions which will indicate at all times the geographical locations or relative positions of an aircraft carrier and an airplane operating therefrom.

Second, to provide an instrument having one indicator that can be moved in accordance with the course and speed of the aircraft carrier and another indicator that can be moved in accordance with the combined factors of the course and speed of the airplane, together with the force and direction of the wind.

Third, to provide a self-driven instrument for indicating the relative positions of an airplane and the carrier from which it is flying upon which the three factors affecting their positions can be set by suitable knobs and dials.

With the above and other objects in view, this invention consists of such construction and arrangement of parts as will be more fully described hereinafter in connection with the accompanying drawings, in which:

Fig. 3 shows one of the three graduated wheels for setting speed of airplane, speed of carrier or force of the wind;

Fig. 4 shows an apparatus for securing a chart and which is adapted to be inserted in the machine of Fig. 2 directly under the intersecting wires;

Fig. 5 shows the carrier indicator;

Fig. 6 shows the airplane indicator;

Fig. 7 shows a differential used in summing up the two factors affecting the airplane;

Fig. 8 shows one of the four clutches used in disconnecting the driving apparatus while setting the position of the indicators by hand.

Figure 1:
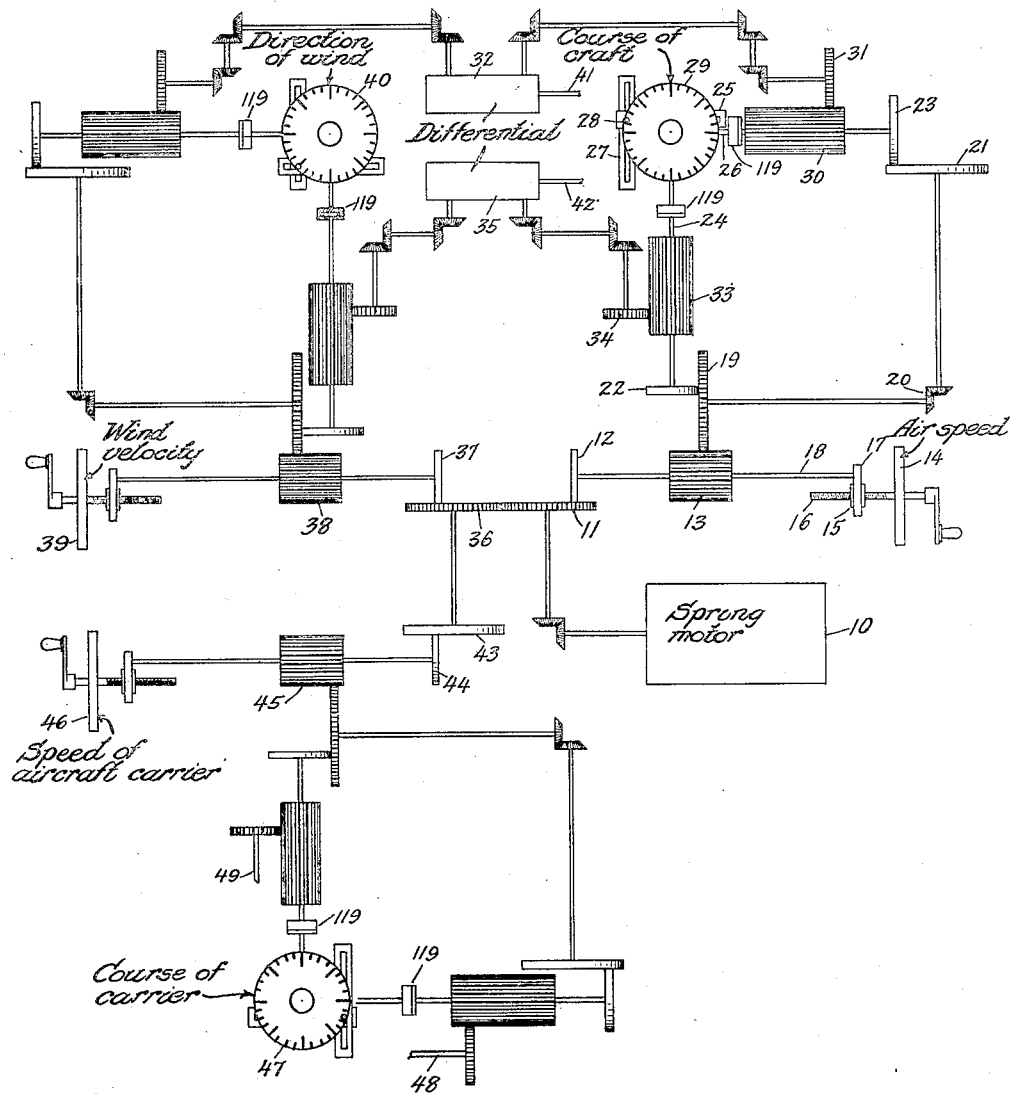
Fig. 1 is a diagrammatic sketch of the apparatus for obtaining the desired motions for the aircraft carrier indicator and for the airplane indicator.

In Fig. 1, the spring motor 10 is controlled accurately as to speed, like a clockwork mechanism, and is the driving power of the entire apparatus. It drives primary toothed disk 11 at a constant speed which, in turn, by friction drives primary friction wheel 12 at a speed that is proportionate to its setting which may be varied from the center to the outside edge of the disk. The cog wheel 13 is sufficiently wide to permit this movement, and the adjustment is made in accordance with the air speed of the airplane as indicated on the dial on wheel 14. As wheel 14 is turned, the nut 15 moves along shaft 16, and the collar 17 being connected to shaft 18 moves the wheel 12. This is shown clearly in Fig. 3.

Having produced a motion which is proportionate to the speed of the airplane, the next step is to resolve it into two components, X and Y, at right angles to each other. Secondary toothed disk 19 engages cog-wheel 13 and through beveled gear 20 drives disk 21. The Y component of the airplane's motion is taken from toothed disk 19 by secondary friction wheel 22 and the X component from disk 21 by friction wheel 23. Wheel 22 through shaft 24 is connected to slotted yoke 25, and wheel 23 through shaft 26 is connected to slotted yoke 27. Slotted yoke 25 slides over slotted yoke 27, and crank 28 attached to disk 29 projects down through the slots of both yokes. It is readily seen that as disk 29 is turned, carrying crank 28 through an angle, the exact X component of the motion is imparted to wheel 23 and the exact Y component of the motion is imparted to wheel 22. When crank 28 is at the side of disk 29, as seen in Fig. 1, wheel 23 is at its maximum radius on disk 21 while secondary friction wheel 22 is at the center of secondary toothed disk 19. This corresponds to a course of two seven zero or due west when the motion is all in the X direction with none in the Y direction. Disk 29 is graduated from zero to 360 degrees. It is thus seen that as crank 28 is set to the angle corresponding to the course of the airplane, that its motion is resolved through wheels 23 and 22 into the proper X and Y components. The X motion is taken from cog-wheel 30 by cog-wheel 31 and through appropriate beveled gears is connected to differential 32. The Y motion is taken from cog-wheel 33 by cog-wheel 34 and through appropriate beveled gears is connected to differential 35. The cog-wheels 30 and 33 are wide enough to permit the full movement of wheels 23 and 22 across the faces of disks 21 and 19 respectively. Each slotted yoke is connected to its corresponding shaft by a swivel joint 119.

The next step is to produce a movement which bears the same relation to the force of the wind as the first produced movement bears to the air speed of the airplane. This movement is then split up into its X and Y components and combined according to algebraic signs with the X and Y components respectively of the airplane.

This is accomplished by engaging primary toothed disk 11 by a similar primary toothed disk 36 which will be driven at the same constant speed. This in turn drives wheel 37 at a speed that is proportionate to its setting which may be varied from the center to the outside edge of the disk. The cog-wheel 38 is sufficiently wide to permit this movement, and the adjustment is made in accordance with the force of the wind, as indicated on the dial on wheel 39. The apparatus and its operation is similar to that used in setting the airplane speed by wheel 14. The direction of the wind is similarly set on disk 40 as the airplane course is set on disk 29.

Figure 2:
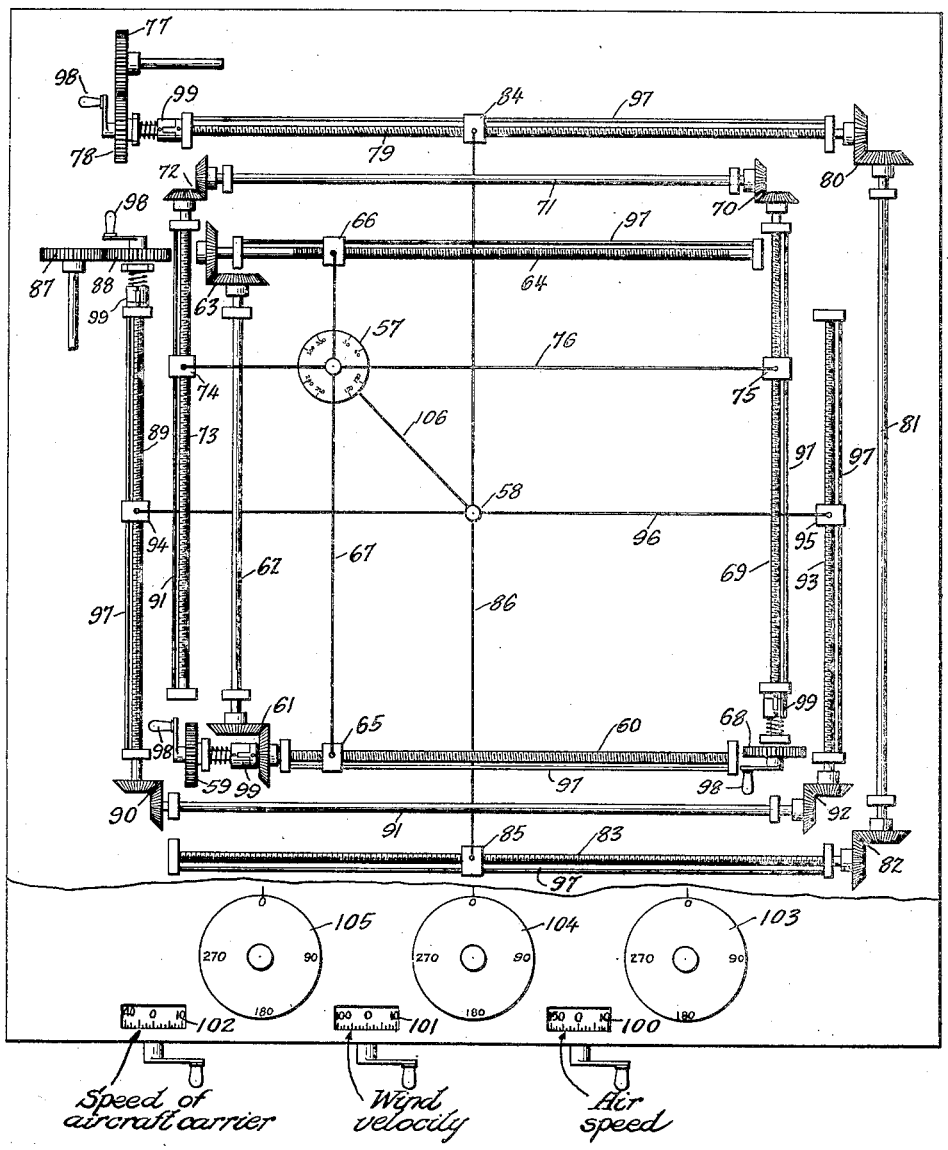
Fig. 2 is a diagrammatic sketch showing the indicators and the apparatus for applying the motions to them, together with dials and knobs for setting the three involved factors on the instrument.

The motion representing the force of the wind is split up into its X and Y components by apparatus similar to that used in splitting up the motion of the airplane, as may be seen by a reference to Fig. 1. These X and Y components are likewise connected through suitable gears to differentials 32 and 35 respectively. Differential 32 combines the two X components algebraically and differential 35 does the same for the Y components. The resultant of these two X components is taken from its differential by shaft 41, and the corresponding resultant Y component from its differential by shaft 42. These shafts, through suitable gears, move the airplane indicator in the X and Y direction as shown in Fig. 2.

The motion of the aircraft carrier is produced through a primary disk 43 which, being connected directly to primary disk 36, has the same constant speed as primary disk 11. Primary disk 43 drives primary friction wheel 44 at a speed which is proportionate to its setting which may be varied from the center to the outside edge of the disk. Cog-wheel 45 is sufficiently wide to permit this movement, and the adjustment is made in accordance with the speed of the aircraft carrier as indicated on the dial on wheel 46. The apparatus and its operation is similar to that used in setting the airplane speed by wheel 14. The course of the aircraft carrier is similarly set on disk 47 as the airplane course is set on disk 29. The motion representing the speed of the carrier is split up into its X and Y components by apparatus similar to that used in splitting up the motion of the airplane, as may be seen in Fig. 1. The X components of the carrier's motion is taken from shaft 48, and the Y component from shaft 49. These shafts, through suitable gears, move the aircraft carrier indicator in the X and Y directions, as shown in Fig. 2.

In order to reduce weight, it may be necessary to make the wide cog-wheels 13, 33, etc., associated with the friction wheels 12, 22, etc., narrow. Each one could be slidingly keyed to its shaft and held in engagement with its associated cog-wheel by a forked arrangement. Another way to accomplish the same result would be to secure the shaft, secure a narrow cog-wheel to the shaft in place of the wide one, and to obtain the desired motion by having the friction wheel slidingly keyed to the shaft, the slotted yokes being connected to a forked arrangement that controls the position of the friction wheel.

When this apparatus is used in connection with a chart, the resultant motions of the airplane and carrier indicators must correspond to the scale of the chart. When using mercator charts whose scale changes with the latitude, the scales on wheels 14, 39 and 46 will have to be replaced with new scales calibrated in accordance with the scale of the chart in use.

A type of differential which may be used for 32 and 35, Fig. 1, is shown in Fig. 7. The motion of the two shafts 50 and 51 are combined to drive shaft 52. The beveled wheels 53 and 54 are united with their driving collars but are free to turn about, that is, not keyed to, shaft 52. The revolving of beveled wheels 55 and 56 about the axis of shaft 52 causes it to rotate. If beveled wheel 53 rotates in one direction and beveled wheel 54 rotates at the same speed in the opposite direction, the shaft 52 will not rotate, but if wheels 53 and 54 rotate in the same direction, wheels 55 and 56 will revolve, and consequently shaft 52 will rotate at their combined speeds, which, if their speeds are equal, will be double the speed of either one. Thus it will be seen that such a differential will accurately combine the wind and the airplane components.

In Fig. 2, the indicator 57 represents the airplane and is moved according to the resultant of the airplane course and speed and the force and direction of the wind. The indicator 58 is moved according to the course and speed of the aircraft carrier. These indicators are moved by wires, the ends of which are secured to nuts that travel on threaded shafts.

The shaft 41, Fig. 1, through suitable gears, drives a cog-wheel, not shown, which engages cog-wheel 59, Fig. 2, thereby driving threaded shaft 60 which, in turn, through beveled gears 61, shaft 62 and beveled gears 63, drives threaded shaft 64. The beveled gear ratios being unity, shafts 60 and 64 rotate at the same speed and are so threaded that nuts 65 and 66 move uniformly as regards speed and direction, carrying the X wire 67 so as to maintain it constantly parallel to its initial position, and through this wire imparting the X motion to the airplane indicator 57. The shaft 42, Fig. 1, through suitable gears, drives a cog-wheel, not shown, which engages cog-wheel 68, Fig. 2, thereby driving threaded shaft 69, which, in turn, through beveled gears 70, shaft 71 and beveled gears 72, drives threaded shaft 73. The beveled gear ratios being unity, shafts 69 and 73 rotate at the same speed and are so threaded that nuts 74 and 75 move uniformly as regards speed and direction, carrying the Y wire 76 so as to maintain it constantly parallel to its initial position which is at right angles to wire 67, and through this wire 76 imparting the Y motion to the airplane indicator 57. Thus it will be seen that the airplane indicator is maintained at the intersection of wires 67 and 76, giving it X and Y components proportionate to those of the airplane motion, and hence, its resultant motion is correspondingly proportionate to the airplane motion.

The shaft 48, Fig. 1, through suitable gears, drives cog-wheel 77, that engages cog-wheel 78, and through it driving threaded shaft 79 which, in turn, through beveled gears 80, shaft 81 and beveled gears 82 drives threaded shaft 83. The shafts 79 and 83 rotate at the same speed and move the nuts 84 and 85 uniformly as regards speed and direction, carrying the X wire 86 so as to maintain it constantly parallel to its initial position and through this wire imparting the X motion to the aircraft carrier indicator 58. The shaft 49, Fig. 1 through suitable gears, drives cog-wheel 87 that engages cog-wheel 88 and through it driving threaded shaft 89 which, in turn, through beveled gears 92 drives threaded shaft 93. The shafts 89 and 94 rotate at the same speed and move the nuts 94 and 95 uniformly as regards speed and direction, carrying the Y wire 96 so as to maintain it constantly parallel to its initial position which is at right angles to wire 86, and through this wire 96 imparting the Y motion to the aircraft carrier indicator 58. Thus it will be seen that the aircraft carrier indicator is maintained at the intersection of wires 86 and 96, giving it X and Y components proportionate to those of the carrier motion, and hence, its resultant motion is correspondingly proportionate to the carrier's motion.

The two X wires 67 and 86 and the two Y wires 76 and 96 are parallel to each other and the guides 97 allow the wire-carrying nuts longitudinal motion but prevent their turning on their respective shafts.

Normally, the airplane will start from the carrier and indicator 57 will be set directly over indicator 58, but regardless of whether or not they leave from the same point, their initial geographical positions or relative positions will have to be set on the machine. To do this, handles 98 and clutches 99 are provided with each X and Y mechanism. In setting the X wires of the carrier, cog-wheel 78 is pulled to the left disengaging it from cog-wheel 77, and the crank turned as necessary to move the X wire 86 to the desired initial position. The other X and Y wires are similarly set. The clutch 99 will be further described in connection with Fig. 8.

The speed dials 14, 39 and 46, Fig. 1, are arranged conveniently near the front of the instrument, as shown 100, 101 and 102, and the course or direction disks 29, 40 and 47 are controlled by conveniently arranged dials 103, 104 and 105. When these have all been set, the motor 10 is started. As changes occur in the factors set on the machine, the proper dials will be correspondingly adjusted. The indicator 58 will then follow the consecutive positions of the carrier, and the indicator 57 the consecutive positions of the airplane. As the indicators separate, wire 106 will be drawn out, as will be described later, the length of this wire indicating the distance between the carrier and the airplane, and the bearing of the carrier from the airplane being indicated by this wire on the graduated disk of indicator 57. Of course, this bearing is not the proper course to steer to intercept the carrier, as account must be taken of the course and speed of the carrier. But an attempt should be made to put the airplane on a collision course, the same being set on the machine. If successful, as the airplane approaches the carrier the bearing will not change. If, however, the relative bearing increases or decreases, the course should be changed accordingly until the bearing is constant, when the observed course should be maintained until the carrier is sighted.

In Fig. 8, clutch 99 is shown in detail. The shaft 97 has a tongued piece 107 at its end which fits snugly into forked piece 108 of the clutch. These pieces are pressed together by spring 109 acting on bearing 110 and piece 108. When setting the machine by hand, handle 98 is pulled out until cog-wheel 78 is disengaged from cog-wheel 77, Fig. 2, spring 109 being fully compressed, but forked piece 108 still engaging the end of tongue piece 107 through which the shaft 97 is turned. When adjusted, handle 98 is then pressed in until cog-wheel 78 engages cog-wheel 77, Fig. 2. During operation the spring 109 maintains this engagement.

In Fig. 5 the carrier indicator 58, Fig. 2, is shown in greater detail. The wire 106, Fig. 2, passes down through hole 111 and winds up on drum 112 which is provided with a spring to keep the wire taut on the drum and maintain a proper tension on it as it is pulled out. The X wire 86, Fig. 2, passes through hole 114 and the Y wire 96, Fig. 2, passes through hole 113.

In Fig. 6, the airplane indicator, Fig. 2, is shown in greater detail. The wire 106, Fig. 2, is attached at point 116 at the bottom of the indicator. The machine is so constructed that the lower part of indicator 57 passes just over the top of indicator 58. The disk 115 is graduated in degrees from zero to 360. The X wire 67, Fig. 2, passes through hole 117 and the Y wire 76 passes through hole 118.

The chart is secured and properly oriented to the apparatus shown in Fig. 4. It should be adjusted so that the geographical location of the reference vessel is near the center of the apparatus or near one edge, if known in advance that the movements of both airplane and reference vessel will be away from that edge. In setting the indicator, the wires are moved until they intersect at the proper points the scales of latitude and longitude marked on the chart.

Another use of the instrument is in checking the compass. The airplane in fair weather flies between two points with markers to follow to keep on the direct line between them. The true course by compass is set on the instrument, the indicator 57 being set over the initial point.

When the plane arrives at the second point, the indicator should be over the second point on the chart. If not, the bearing indicated by wire 106 is noted, the indicator 57 is moved until it is over the second point and the change in bearing indicated by wire 106 is noted. This change is the error in the initial correction applied to the compass.

While in the foregoing there has been illustrated and described such combinations and arrangements of elements as constitute the preferred embodiment of my invention, it is nevertheless desired to emphasize the fact that interpretation of the invention should be conclusive only when made in the light of the subjoined claims.

The invention described herein may be manufactured and used by or for the Government of the United States of America for governmental purposes without the payment to me of any royalties thereon.

I claim:

1. A navigational instrument comprising means producing a first motion proportionate to the speed of an aircraft, means producing a second motion proportionate to the velocity of the wind, means resolving each motion into two mutually normal vectors, means algebraically combining the respective parallel vectors, a first indicator, means positioning said indicator in accordance with the resultant of the two vector movements, means producing a motion proportionate to the speed of a reference vessel, means resolving said motion into two mutually normal vectors, a second indicator, means positioning said second indicator in accordance with the resultant of said last two vectors, and means jointly controlled by said two indicators for giving the course from one to the other, all vectors being to substantially the same scale.

2. A navigational instrument, comprising means for producing a first, a second, and a third motion, means for varying each of said three motions, means for resolving each of said motions into corresponding X and Y components along mutually normal directions, means for respectively combining the X components and the Y components of said first and second motions, means for causing a first indicator to move in accordance with the combined X and Y components of said first and second motion, means for causing a second indicator to move in accordance with the X and Y components of said third motion, and means cooperating with said indicators to indicate the location of said second indicator in relation to said first indicator.

3. A navigational instrument, comprising a constant speed motor, three constant speed primary disks driven by said motor, a primary friction wheel adjustable radially of each primary disk, a first, a second, and a third set of secondary disks driven respectively by said primary friction wheels, a first, a second and a third set of secondary friction wheels each adjustable radially of its corresponding secondary disks, a first and second resolving means for adjusting respectively said first and second sets of secondary friction wheels radially of said corresponding secondary disks, and first and second differentials for combining corresponding parallel motions from said first and second sets of secondary friction wheels.

4. A navigational instrument, comprising a first and a second set of threaded shafts, all parallel to each other, a third and, a fourth set of threaded shafts all parallel to each other and at right angles to said first and second sets of shafts, all of said sets of shafts being driven by a common source of power, a nut movable along and a guide for said nut associated with each of said threaded shafts, a wire extended between the nuts of corresponding shafts of opposed pairs, a first indicator adapted to be maintained at the intersection of the wires extending between the first and third set of shafts, and a second indicator adapted to be maintained at the intersection of the wires extending between the second and fourth sets of shafts.

5. A navigational instrument, comprising a constant speed motor, three constant speed primary disks driven by said motor, a primary friction wheel driven by each primary disk, means for adjusting said primary friction wheels radially of said primary disks respectively in accordance with air speed of an airplane, velocity of the wind and speed of a reference vessel, a first, a second, and a third pair of secondary disks driven respectively by said primary friction wheels, a first, a second, and a third pair of secondary friction wheels each driven by its corresponding secondary disk, three double slotted yoke crank mechanisms each adapted to convert circular motion into rectilinear motion in two directions at right angles to each other for adjusting each pair of secondary friction wheels radially of said corresponding secondary disks in accordance with the course of an airplane, direction of the wind and course of a reference vessel, and first and second differentials for combining corresponding parallel components from said first and second pairs of secondary friction wheels.

ROBERT HALL SMITH.